Figure 1:
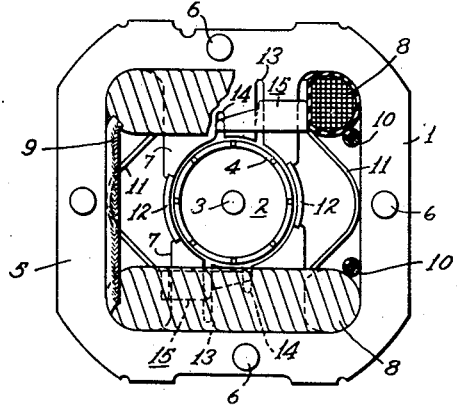

April 19, 1949.  G. H. KOCH  2,467,755
SHADING COIL
Filed Nov. 27, 1946

WITNESSES:
Edward Michaels
Wm. La Goome

INVENTOR
Gustav H. Koch.
BY F. P. Lyle
ATTORNEY

Patented Apr. 19, 1949

2,467,755

UNITED STATES PATENT OFFICE 2,467,755

SHADING COIL

Gustav H. Koch, Springfield, Mass., assignor to Westinghouse Electric Corporation, East Pittsburgh, Pa., a corporation of Pennsylvania Application November 27, 1946, Serial No. 712,717

4 Claims. (Cl. 172—36)

The present invention relates to small, single-phase electric motors of the shaded-pole type, and, more particularly, to an improved shading coil for such motors.

Single-phase, shaded-pole motors have oppositely disposed salient pole pieces, which carry short-circuited shading coils encircling lateral portions of the pole pieces, for retarding the magnetic flux in those portions of the pole pieces, relative to the main flux, in order to develop a starting torque. In one construction of motors of this type, each pole piece has two longitudinal slots cut in it, forming two teeth at one side of the pole, and two shading coils are utilized, one coil being placed in the outermost slot and encircling the outermost tooth, and another, larger coil, of smaller cross-sectional area, being placed in the other slot and encircling both teeth. These shading coils are continuous, single-turn, copper coils encircling the pole teeth, and, in their most satisfactory and economical form, they have been made from copper tubing, which was formed to a rectangular cross-section, and pieces cut off to the desired axial length to make the coils. In the case of the larger coils, it was necessary, because of their shape, to cut them off by sawing, and the amount of copper lost in the sawing operation was almost equal to the amount of copper in the coil itself. Thus, this method of making the coils was relatively wasteful and expensive. Furthermore, in cutting and sawing the coils from the rectangular tubing, it was very difficult to keep the finished coils accurately rectangular, and distortion of the coils from the proper shape frequently resulted in considerable difficulty in assembling the coils on the pole pieces. The cutting or sawing operation also left the coils with square ends and sharp edges, which added to the difficulty of assembling them in the slots of the pole pieces, and involved the risk of damaging the insulation of the main field coils, which are assembled over the shading coils.

The principal object of the present invention is to provide an electric motor of the shaded-pole type utilizing improved and relatively inexpensive shading coils.

Another object of the invention is to provide an electric motor of the shaded-pole type having shading coils of improved electrical characteristics, which require less material than the conventional shading coils.

A further object of the invention is to provide a one-piece shading coil for electric motors, which can be made more easily, and at lower cost, than the two coils which have previously been used, and which can be assembled in place in a motor more easily and rapidly.

Figure 2:
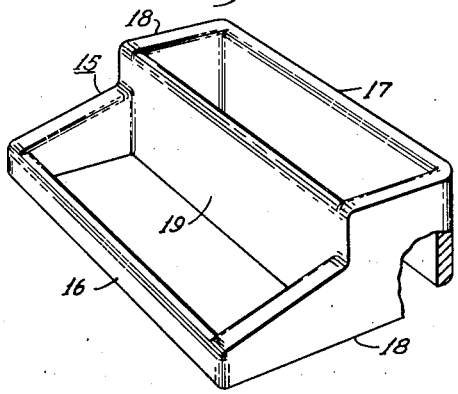

Other objects and advantages of the invention will be apparent from the following detailed description, taken in connection with the accompanying drawing, in which:

Figure 1 is an end view of an electric motor embodying the invention, with one of the field coils partially broken away; and Fig. 2 is an enlarged perspective view of a shading coil.

The invention is shown in the drawing embodied in a small, single-phase, two-pole, shaded-pole motor having a stator member 1 and a rotor member 2. The rotor member 2 may be of any suitable type, and comprises a laminated core mounted on a shaft 3 and carrying a squirrel-cage winding 4.

The stator member 1 includes a laminated stator core 5, of any suitable type, comprising a plurality of laminations secured together by rivets 6, or in any other suitable manner. The core 5 is generally rectangular, with a central opening, and has two oppositely disposed salient pole portions or pole pieces 7, the ends of which are arcuately shaped to receive the rotor 2 between them. The pole pieces 7 are preferably laterally offset from each other, as indicated in Fig. 1, in order to provide equal space for the field windings on both sides of each pole piece, as more fully described and claimed in my co-pending application, Serial No. 712,716, filed November 27, 1946, and assigned to Westinghouse Electric Corporation. The field winding of the motor consists of two coils 8, which are placed on the pole pieces 7 and connected in series by a lead 9. Each of the coils 8 also has a lead 10 for connecting the motor to the external circuit. The coils 8 are retained in position by spring clips 11, or in any other suitable manner. Slotted wedges 12 may be provided on each side of the rotor between the pole pieces 7, to provide the required magnetic leakage, and the wedges 12 are supported in notches in the tips of the pole pieces. Each of the pole pieces 7 is provided with a longitudinal slot 13, near one side of the pole piece, and a second, shorter, slot 14 closer to the center, forming two teeth at one side of each pole piece. A shading coil 15 is disposed in the slots 13 and 14 of each of the pole pieces 7.

The shading coil 15, to which the present invention is particularly directed, is more clearly shown in the enlarged perspective view of Fig. 2. As there illustrated, the coil 15 is a single, unitary piece of copper, or other suitable metal, which is formed in the shape of a hollow rectangle having sides 16 and 17 and end walls 18. It will be noted that the side wall 17 is considerably higher than the side wall 16. An intermediate wall portion 19 divides the coil 15 into two coil portions, the portion which includes the side wall 17 being of greater axial length than the portion which includes the side wall 16. The end walls 18 are tapered down from the intermediate wall portion 19 to the side wall 16, as clearly seen in Fig. 2, and the top and bottom edges of all the walls are rounded to facilitate assembly of the coil in the motor. The coil 15 is assembled on the pole piece 7 with the central wall portion 19 in the longer slot 13 and the wall portion 16 in the shorter slot 14. It will be apparent, therefore, that the coil provides a portion which encircles the outer tooth of the pole, and a portion which encircles both teeth, in much the same manner as the two separate coils of different sizes which have previously been used, and an additional closed circuit is provided encircling the inner tooth, which was not obtained with the separate coils.

The coil 15, being a single unitary piece, can readily be produced by impact extruding in a press, or by an equivalent process. This method of making the coil involves only a very slight waste of metal, since the only waste is the thin flash formed in the extruding operation, which is readily removed in a subsequent punch press operation. Thus, the new coil can be produced more easily and cheaply than was possible with the two separate coils of the prior practice, and with much less waste of material. The difficulty of keeping the coil accurately shaped during manufacture and assembly, which was encountered in the prior practice, is eliminated and, because of the precision methods used in making the new coil, it can be made to fit more closely on the core, permitting the use of a smaller field coil.

The one-piece coil of the present invention also has improved electrical characteristics, as compared to the two separate coils previously used. In the previous arrangement, the voltage difference between the two separate coils was so slight that there was no substantial current flow between the coils, and they functioned essentially as separate and independent electrical circuits. The new shading coil 15, however, includes three circuits, extending through the outside walls 16, 17 and 18, and through each of the outside walls 16 and 17 and the center wall 19. The currents in the center wall 19 are almost out of phase and tend to cancel each other, and the currents in the outside wall 16, which have substantial in-phase components, only partly add. The result of this is that the new coil is more effective than the two separate coils of the prior practice, and the same shading effect can be obtained with substantially less copper.

The reduction in the space required for the new coil, resulting from its greater effectiveness, is an important advantage of the invention, since it makes it possible to use other metals of higher resistivity than copper but which are more readily formed to the desired shape by such processes as impact extruding or die casting. Thus, it has been found that aluminum, with approximately twice the resistivity of copper, can be utilized in a one-piece coil which does not require any greater space than the two copper coils of the prior art, but is equally effective and can be easily and cheaply produced. The rounded edges of the new coil facilitate assembly of the coil in the slots of the pole pieces and eliminate any danger of damaging the insulation of the field coil when it is put in place over the shading coil. Assembly of the new shading coil on the pole piece is also facilitated by the fact that only a single member must be inserted in the slots instead of the two separate members previously used.

It will be apparent, therefore, that a shading coil has been provided for small, shaded-pole motors which makes possible a material saving in cost, and improved electrical performance. It will be obvious that although a specific embodiment of the invention has been shown and described, various modifications may be made within the scope of the invention, and that the new shading coil may be applied to motors of different specific construction than that shown for the purpose of illustration. It is to be understood, therefore, that the invention is not restricted to the specific details of construction shown, but in its broadest aspects, it includes all equivalent embodiments and modifications which come within the scope of the appended claims.

I claim as my invention:

1. An electric motor having a stator member and a rotor member, said stator member having oppositely disposed salient pole portions, field windings disposed on said pole portions, each of the pole portions having slots therein forming two teeth at one side of the pole portion, and a one-piece, unitary shading coil disposed in the slots of each pole piece and having a portion encircling one of said teeth, a portion encircling the other of said teeth, and a portion encircling both of said teeth.

2. An electric motor having a stator member and a rotor member, said stator member having oppositely disposed salient pole portions, field windings disposed on said pole portions, each of the pole portions having slots therein forming two teeth at one side of the pole portion, and a one-piece unitary shading coil disposed in the slots of each pole piece, each of said shading coils having portions encircling each of said teeth and a portion encircling both of said teeth.

3. A shading coil for an electric motor, said shading coil comprising a single unitary metal member substantially in the shape of a hollow rectangle with a central wall portion dividing the member into two coil portions, said central wall portion being common to both coil portions and one of the coil portions being of greater axial length than the other.

4. A shading coil for an electric motor, said shading coil comprising a single unitary metal member substantially in the shape of a hollow rectangle with a central wall portion dividing the member into two generally rectangular coil portions, one of said coil portions having four sides of substantially equal axial length and the other of said coil portions being of shorter axial length.

GUSTAV H. KOCH.

REFERENCES CITED

The following references are of record in the file of this patent:

UNITED STATES PATENTS

| Number | Name | Date |
|---|---|---|
| 1,036,757 | Walker | Aug. 27, 1912 |
| 2,049,261 | Haydon | July 28, 1936 |
| 2,096,518 | Janzen | Oct. 19, 1937 |
| 2,122,374 | Kohlhagen | June 28, 1938 |
| 2,251,673 | Gillen | Aug. 5, 1941 |